United States Patent [19]
Lessard

[11] 3,790,806
[45] Feb. 5, 1974

[54] REMOTE ENGINE STARTING SYSTEM

[76] Inventor: Victor Lessard, 3335 Willow, Dearborn, Mich. 48124

[22] Filed: Aug. 18, 1972

[21] Appl. No.: 281,847

[52] U.S. Cl. .................................. 290/37, 290/38
[51] Int. Cl. ........................................... B60k 33/00
[58] Field of Search. 290/37, 38, DIG. 3; 123/179 B

[56] References Cited
UNITED STATES PATENTS

| | | | |
|---|---|---|---|
| 3,696,333 | 10/1972 | Mott | 290/38 |
| 3,130,318 | 4/1964 | Curtis | 290/38 |
| 3,653,699 | 4/1972 | Podesta | 290/38 |
| 2,710,926 | 6/1955 | Charles | 290/37 |
| 3,530,846 | 9/1970 | Bean | 290/38 |
| 3,455,403 | 7/1969 | Hawthorne | 290/38 |
| 3,657,720 | 4/1972 | Audenko | 290/37 A |
| 3,009,067 | 11/1961 | Janeczko et al. | 290/38 |
| 3,577,164 | 5/1971 | Baratelli | 290/37 |

Primary Examiner—G. R. Simmons
Attorney, Agent, or Firm—Harness, Dickey & Pierce

[57] ABSTRACT

A remotely controlled automobile engine starting control system which includes a radio transmitter remotely located from a radio receiver and the control circuit, the actuation of the control circuit from the transmitter initiating the timing of two preselected periods, the first of which controls the actuation of the automobile ignition and engine cranking systems until such time as the engine is started and the second of which controlling the period which the engine will run after actuation of the radio transmitter. The system further includes various safety features to preclude theft of the automobile as a result of the engine running and a system for initiating the energization of the accessory circuitry to permit energization of, for example, the air conditioning or heating system.

28 Claims, 1 Drawing Figure

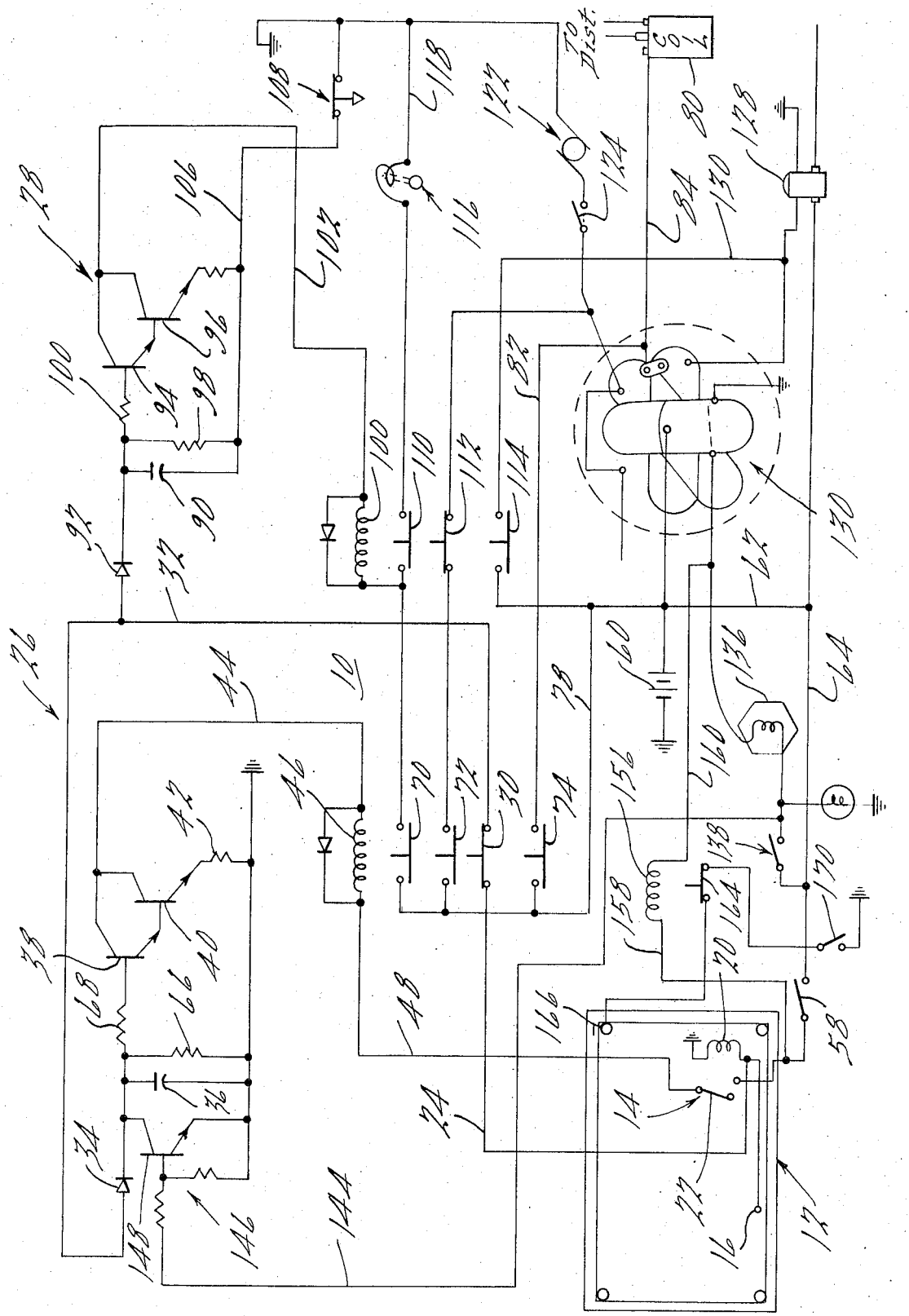

REMOTE ENGINE STARTING SYSTEM

BACKGROUND AND SUMMARY OF THE DEVELOPMENT

This invention relates generally to a remote controlled, radio operated, engine starting system and more particularly to an engine starting control system of the type described which utilizes a first and second timing circuit to control the energization of the ignition and starter systems and the period which the engine will run after the transmitter is actuated, respectively.

The need has arisen for a remotely controlled engine starting system which is relatively inexpensive to manufacture, is reliable in operation and provides certain safety features to preclude the theft of the automobile after the automobile has been started. Further, it is desirable to provide a remote controlled starting system which includes a single actuator at the transmitter to permit the operator merely to actuate a single button, or other actuator, to start the engine and reactuate the button to stop the engine. If the engine should stall after starting it is merely necessary to reset the circuit by again actuating the button to reset the circuitry. Certain other systems have been suggested which, for the most part, are extremely complicated in operation and do not provide all of the safety features which should be provided with systems of this type.

With the system of the present invention, a receiver is provided which is interconnected with the energy source of the automobile and the ignition system, starter system and accessory circuitry of the vehicle as it is installed upon manufacture of the vehicle. A remote transmitter is provided which, when actuated, provides a single or multi-tone airborne signal to actuate the receiver or disable the receiver if it is desired to stop the vehicle. The proper energization of the receiver causes a circuit to initiate two timing periods, the first (starting timer) of which has been selected, for illustrative purposes only, to be a twelve second timer to time the duration which the cranking motor is energized if the vehicle should not start within the preselected period. The second timer (running timer) has been selected, for illustrative purposes, to be a 10 minute timer to control the duration which the engine will run if unattended. Thus, with the system of the present invention, the engine will be permitted to run for approximately 10 minutes before it is automatically shut down to avoid the possibility that the engine will be left running until it runs out of fuel.

The 10 minute timer is utilized to energize a relay which controls a plurality of switches, one of which is utilized to disable a charging circuit within the two timers to stop the charging of a pair of capacitors within the timers and initiate the timing of the timers by discharging the capacitors. The other switches are utilized to control the ignition circuit to energize the ignition coil, to control the accessory circuit to enable the accessory circuit and to control a circuit to a fuel solenoid which is utilized to open the throttle upon actuation of the remote starting circuit.

The second timer, the 12 second timer, controls, through a relay coil, three switches. The first switch is a normally open switch which is closed upon energization of the 12 second timing circuit to energize the cranking motor. The second switch is connected in series with the accessory switch of the first timing circuit to disable the accessory circuit during the period that the starting cycle is occurring. The third switch is a switch connected in series with the fuel solenoid switch of the 10 minute timer, the 12 second timer closing that switch to open the throttle during starting. The opening of the throttle will operate the choke depending on the temperature.

Upon starting, the engine generates a vacuum which is sensed by a vacuum switch. The vacuum switch is connected in circuit with the 12 second timer to disable the 12 second timer upon starting of the engine. This, of course, disables the fuel solenoid to permit the throttle to return to a normal running position, disables the starter circuit to stop the engine cranking motor and reconnects the accessory circuit to permit the accessories which have been previously actuated to be operated during the time that the engine is running.

The circuit further includes safety features to preclude theft of the car when the engine is running. For example, a door switch is provided which will deenergize the receiver upon opening of the vehicle door when the engine is running. The system further includes a hood switch which, when opened, will also disable the receiver circuit to turn off the engine upon opening of the hood. Further, the system includes a means for changing the idle speed of the engine if the engine should be idling too fast. In this mode of operation, the engine is initially started and, upon discovery of the fast idle condition, the engine is stopped and restarted after waiting a preselected period of time. On the second start, the engine will idle at a lower speed.

Accordingly, it is one object of the present invention to provide an improved remote controlled engine starting system.

It is another object of the present invention to provide an improved remote engine starting system which is capable of timing the period in which the engine is cranking.

It is a further object of the present invention to provide an improved engine starting system of the type described which further includes a timing circuit for timing the period in which the engine will run after starting.

It is still a further object of the present invention to provide an improved remote engine starting system which is simple to install after the vehicle has been manufactured and in use.

It is still a further object of the present invention to provide an improved remote starting system which provides a plurality of safety features to preclude theft of the vehicle after the engine is started.

It is still a further object of the present invention to provide an improved remote engine starting system which is disabled upon insertion of the ignition key for normal operation.

It is still a further object of the present invention to provide an improved remote engine starting system which is inexpensive to manufacture and reliable in use.

Further objects, features and advantages of this invention will become apparent from a consideration of the following description, the appended claims and the accompanying drawing in which:

The single FIGURE of the drawing is a schematic diagram illustrating a preferred form of remote engine starting system incorporating the features of the present invention.

Referring now to the drawing, a remote system 10 is illustrated, which is energized by a receiver circuit 12, the receiver circuit being controlled remotely by a transmitter (not shown). In the preferred form of the invention, the receiver includes a Connell Dublier relay, the relay switching state with each pulse received from the receiver. The relay 14 is designated as CDE 1077 relay which, when the transmitter is initially actuated, transfers the relay from one state to the opposite state and, upon reactuation, switches the relay back to its original state. The relay 12 is illustrated only in sufficient detail to illustrate its operation and includes a terminal 16 which is energized with a source of 12 volt energy upon actuation of the transmitter to start the engine.

The energization of the terminal 16 with a 12 volt potential energizes a relay coil 20 which closes a switch 22 and latches the switch 22 until such time as the receiver is actuated a second time. Also, the energization of the terminal 16 creates a charging potential on a conductor 24, this charging potential being fed to a 10 minute timing circuit 26 and a 12 second timing circuit 28 through a normally closed switch 30.

Referring first to the charging circuit, charging potential is fed to the 10 minute timing circuit through a conductor 32 and a diode 34 to place a charge on capacitor 36 forming part of the timing circuit 26. The charge time for the capacitor 36 is extremely fast and immediately charges the capacitor 36 to a preselected value.

The charging of capacitor 36 creates a bias for a pair of transistors 38, 40, the transistors 38, 40 being connected in Darlington configuration, the emitter of transistor 40 being connected to ground potential through a resistor 42. The collector supply for transistors 38 and 40 is provided from a circuit including conductor 44, a coil 46, a conductor 48 and the switch 22 which is now in the closed position. The other side of switch 22 is connected to the battery of the vehicle through an on-off switch 58, the right side of switch 58 being connected to the vehicle battery 60 through conductors 62, 64.

Thus, with switch 22 closed and capacitor 36 charged, the transistors 38, 40 will conduct to energize the relay coil 46. The discharge path for the capacitor 36 includes a resistor 66 for one path and resistor 68 and the base-emitter circuits of transistors 38 and 40. These two discharge paths have been selected such that the capacitor 36 will discharge to a level at which transistors 38 and 40 will no longer conduct upon the expiration of 10 minutes from the initial energization of the receiver circuit 12.

The relay coil 46 is connected in controlling relation with a normally open fuel solenoid switch 70, a normally open accessory switch 72, the charging circuit switch 30 and an ignition switch 74, the latter two switches being normally closed and normally open, respectively. Upon energization of the coil 46, the solenoid switch 70 is closed, as is the accessory switch 72. The normally closed charging switch 30 is opened to discontinue the flow of charging current to the timing circuit 26. Further, the normally open ignition switch 74 is closed to energize the ignition circuit.

The closure of the switch 70 enables a fuel solenoid circuit, which circuit is energized upon initiation of the timing period for timer 28, as will be more fully explained hereinafter. The closure of switch 72 also enables the accessory circuit if the timer 28 has timed out, as will be more fully explained hereinafter. The closure of the normally open ignition switch 74 energizes the ignition circuit as long as the ten minute timer 26 has not timed out. This latter circuit is not interconnected with the 12 second timer in view of the fact that the ignition circuit must be energized during the entire period that the motor is both being started and is running. Each of the circuits connected to switches 70, 72 and 74 are in turn connected to the vehicle battery 60 by means of a conductor 78.

Thus, current flows from the battery 60 through conductor 78, through now closed switch 74, to an ignition coil 80 through conductors 82, 84. Thus, this coil will be energized during the period that the switch 74 is closed. As will be seen from a description of timer 28, energy also flows through the fuel solenoid circuit, including switch 70, as long as the timer 28 has not timed out. On the other hand, energy will not flow from the battery 60 to the accessory circuit through switch 72 during the period that the engine is cranking. However, energy will flow after the timer circuit 28 has timed out.

Referring now to the 12 second timer circuit 28, charging current is fed, as was the case for the 10 minute timer 26, through the switch 30 and conductor 32 to a capacitor 90 through a diode 92. The diode 92, and the diode 34, are utilized to preclude the charge on the capacitor 90, in the case of circuit 28, and the capacitor 36, in the case of circuit 26, from being fed to the other timing circuit. Upon charging the capacitor 90, a pair of transistors 94, 96 are caused to conduct, the transistors 94, 96 being connected in a Darlington configuration. The discharge circuit for the capacitor 90 is created through a resistor 98 for one path and a base resistor 100 and the base-emitter circuit of transistors 94, 96 for the other path. The conduction of transistors 94, 96 causes the energization of a relay coil 100 through a circuit including conductor 102, the switch 70, which is now closed due to the energization of the coil 46, and the conductor 78 to the battery 60.

The emitter circuit of the configuration is connected to ground through a conductor 106, and a vacuum switch 108 to ground. The vacuum switch 108 is normally closed and is operated to the open position upon generation of a vacuum in the engine in response to the starting of the engine. The energization of the coil 100 closes a normally open fuel solenoid switch 110, opens a normally closed accessory switch 112, and closes a normally open starter switch 114.

Referring particularly to the fuel solenoid circuit, the switches 70 and 110 complete a circuit from the battery 60 to a fuel solenoid 116, the other side of the fuel solenoid 116 being connected to ground through a conductor 118. Thus, during the 12 second and 10 minute period, both switches 70 and 110 are closed to energize the fuel solenoid 116. However, upon deenergization of the coil 100 after the start of the engine or after the expiration of the 12 second period, the switch 110 will be open to deenergize the coil 116. The energization of the coil 116 opens the throttle to permit the flow of fuel to the engine. As was stated above, if the engine runs at an idle which is too fast, the transmitter circuit can be actuated to switch off the engine and thereafter reactuate it to reenergize the starting circuit. In this situation, the throttle will revert to a lower idle when the solenoid 116 is released due to the starting of the engine. Typically, a 5 second delay should occur between the stopping and restarting of the engine.

Referring now to the accessory circuit, the 10 minute coil 46 closes normally open switch 72 and the 12 second coil 100 opens normally closed switch 112. This condition deenergizes the accessory circuit which deenergizes, for example, the heater circuit 122. The heater circuit 122 includes an on-off switch 124 which must be closed to energize the heater motor. Upon starting of the engine, the coil 100 is deenergized to close normally closed switch 112 to energize the accessory circuit including heater circuit 122. It will be remembered, in this situation, that the 10 minute coil 46 holds switch 72 closed during the 10 minute period.

The switch 114 is also controlled by the coil 100, the switch 114 being closed when the coil 100 is energized. The closure of the switch 114 completes a circuit from the battery 60 through switch 114 to a starter solenoid 128 through a conductor 130, the output of the solenoid being connected to the cranking motor. Thus, during the period that the timer 28 is being timed out and the coil 100 is energized, the switch 114 will be closed to energize the engine cranking motor. Upon starting of the engine, the switch 108 will open to open switch 114 through the deenergization of the coil 100. Thus, the engine cranking motor is disconnected from the source of energy at battery 60.

All of the above described circuits are interconnected with an ignition switch 130 which is normally provided in vehicles of this type. The switch 130 is the normal key operated switch which, when actuated in the normal sequence of ignition-on and engine starting, will energize the circuits described above. Further, the accessory circuit has been provided, which may be actuated in response to a preselected positioning of the key.

Referring now to the auxiliary circuits, a buzzer circuit 136 is provided which is connected through a door switch 138 to the source of energy at conductors 62 and 64 from the battery 60. When the door is closed, the switch 138 is open. If the key is inserted in the ignition switch 130 and the door is opened, the switch 138 will be closed to provide energy to the buzzer 136 to provide a warning to the operator that the key has been left in the ignition. Also, the door switch 138 provides energy to a circuit for discharging the capacitor 36 in the ten minute timer through a conductor 144 and a circuit 146. The circuit 146 includes a transistor 148, the collector emitter circuit of which is connected across the capacitor 36. Upon closure of the switch 138, a source of positive potential is fed to the base electrode of the transistor 148 to cause the transistor 148 to conduct. This will provide an extremely low impedance discharge path for the capacitor 36 to discharge the capacitor 36 and deenergize the timing circuit 26. The deenergization of the timing circuit 26 causes the switches 30 and 70 to 74 to revert to their normal positions to stop the engine.

The insertion of the key into the switch 130 creates a path to ground for a coil 156 through a conductor 158 and a conductor 160. The energization of the coil 156 opens a switch 164 which breaks the circuit to the neutral terminal 166 of the receiver, this neutral terminal being connected to ground through the switch 164 and a hood switch 170. If the hood is closed, the switch 170 is closed to complete the circuit to ground for the neutral terminal. Thus, with the insertion of the key in the circuit 130, the receiver circuit, and the associated control circuit 10 is disabled. In the event that the key is not in the ignition switch 130 and the hood is opened, the switch 70 will also be opened to break the ground circuit to the neutral terminal 166.

In operation, the operator actuates the transmitter which energizes terminal 16 with a source of 12 volt potential. This energizes coil 20 to close switch 22 and complete the path for energization of the coil 46. The energization of the terminal 16 also places charging current through conductor 32 which charges, instantaneously, capacitors 36 and 90 in timing circuits 26 and 28, respectively. This initiates the conduction of transistors 38, 40 to energize the coil 46 in the case of the 10 minute timer. The energization of the coil 46 closes normally open switches 70, 72 and 74 and opens normally closed switch 30. The closure of switch 74 energizes the ignition circuit, and particularly ignition coil 80, and the opening of switch 30 cuts off the flow of charging current to the capacitors 36 and 90. The closure of switches 70 and 72 enables the fuel solenoid coil 116 and the accessary circuit, for example, heater motor circuit 122.

The charging of capacitor 90 causes transistors 94 and 96 to conduct thereby energizing the coil 100 until such time as either the engine has started or the 12 second timer has timed out. The energization of the coil 100 closes normally open switches 110 and 114 and opens normally closed switch 112. The closure of switch 110 energizes the coil 116 to open the throttle to the engine. The closure of switch 114 energizes the cranking motor until such time as the engine starts or the 12 second timer 28 has timed out and the opening of accessory switch 112 disables the accessories until such time as the timer 28 has timed out or the engine has started.

Preferably, the operator should observe the engine starting procedure to note whether the exhaust system is emitting fumes to indicate the starting of the engine or, assuming a turn signal has been left on previously, observing of the flashing of the turn signal light. If the engine starts, the exhaust will emit fumes to indicate this condition. If the engine does not start, at the end of 12 seconds the turn signal will turn on and no fumes will be emitted from the exhaust system.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A remotely controlled engine starting system for controlling the operation of an engine including a transmitter and a receiver positioned remotely from the transmitter, the transmitter controlling the operation of the receiver by means of airborne signals generated by the transmitter, the receiver being connected to control the flow of energy from a source to the starting and running circuits of the engine, the improvement comprising first and second timing circuits having first and second charging circuits, respectively, for controlling the starting period and running period of the engine, respectively, said timing circuits being adapted to generate first and second timing periods, respectively, in direct response to the generation of said airborne signals, said first timing circuit being connected in controlling relation with the ignition circuit to energize the ignition circuit for said first timing period, said second timing circuit being connected in controlling relation with said starting circuit to energize the starting circuit for a period no greater than said second timing period, the receiver including means for energizing said first and second charging circuits in direct response to said receiver receiving airborne signals.

2. The improvement of claim 1 wherein said first timer is connected to disconnect the charging circuit upon the initiation of said first timing period.

3. The improvement of claim 1 further including throttle control means and a throttle control means control circuit including first and second switch means connected in an AND configuration, said first switch means being controlled to enable said throttle control circuit in response to the energization of said first timing period and said second switch means connecting said throttle control means to the source of energy to open the throttle in response to the initiation of said second period.

4. The improvement of claim 3 wherein said second switch means disables said throttle control means in response to the termination of timing said second period.

5. The improvement of claim 4 wherein said first and second switch means open the throttle and said second timing period is terminated in response to the starting of said engine or the termination of said second period.

6. The improvement of claim 1 further including engine starting sensor means connected to sense the starting condition of the engine, the sensing of the started condition of the engine terminating said second timing period.

7. The improvement of claim 6 wherein said engine starting sensor means includes a vacuum switch, said vaccum switch being connected in circuit with said second timing circuit means to terminate the timing of said second period in response to the actuation of said starting switch means.

8. The improvement of claim 7 wherein said timing circuit includes a semiconductor device, the conduction of which is controlled in response to the voltage level of said charging circuit, said charging circuit discharging to time said second period.

9. The improvement of claim 8 wherein said second timing circuit includes relay means connected in controlling relation with said second switch means, said relay means being connected in circuit with two electrodes of said semiconductor means, the actuation of said vacuum switch terminating the energization of said relay means.

10. The improvement of claim 9 wherein said first timing circuit includes relay means connected in controlling relation with said first switch means, said first switch means being actuated in response to the timing of said first period, said second switch means being successively actuable to attempt starting of said engine during the timing of said first period.

11. The remotely controlled system of claim 1 wherein the engine includes an accessory system, the improvement further comprising an accessory circuit controlling a circuit connected between the source of energy and the accessory system, said accessory control circuit being enabled in response to the timing of said first period.

12. The improvement of claim 11 wherein said accessory controlling circuit is also controlled by said second timing circuit, the timing of said second period disabling said accessory system.

13. The improvement of claim 12 wherein said second timing circuit enables said accessory control circuit in response to the termination of timing of said second period.

14. The improvement of claim 13 wherein said second timing circuit includes relay means connected in controlling relation with said second switch means, said relay means being connected in circuit with two electrodes of said semiconductor means, the actuation of said vacuum switch terminating the energization of said relay means.

15. The improvement of claim 13 wherein said first timing circuit includes relay means connected in controlling relation with said first switch means, said first switch means being actuated in response to the timing of said first period, said second switch means being successively actuable to attempt starting of said engine during the timing of said first period.

16. The remotely controlled system of claim 14 wherein the engine includes an accessory system, the improvement further comprising an accessory circuit controlling a circuit connected between the source of energy and the accessory system, said accessory control circuit being enabled in response to the timing of said first period.

17. The improvement of claim 10 further including throttle control means and a throttle control means control circuit including first and second switch means connected in an AND configuration, said first switch means being controlled to enable said throttle control circuit in response to the energization of said first timing period and said second switch means connecting said throttle control means to the source of energy to open the throttle in response to the initiation of said second period.

18. The improvement of claim 17 wherein said second switch means disables said throttle control means in response to the termination of timing said second period.

19. The improvement of claim 18 wherein said first and second switch means open the throttle and said second timing period is terminated in response to the starting of said engine or the termination of said second period.

20. The remotely controlled system of claim 19 wherein the engine includes an accessory system, the improvement further comprising an accessory circuit controlling a circuit connected between the source of energy and the accessory system, said accessory control circuit being enabled in response to the timing of said first period.

21. The improvement of claim 20 wherein said accessory controlling circuit is also controlled by said second timing circuit, the timing of said second period disabling said accessory system.

22. The improvement of claim 21 wherein said second timing circuit enables said accessory control circuit in response to the termination of timing of said second period.

23. The improvement of claim 22 wherein said second timing circuit includes relay means connected in controlling relation with said second switch means, said relay means being connected in circuit with two electrodes of said semiconductor means, the actuation of said vacuum switch terminating the energization of said relay means.

24. The improvement of claim 23 wherein said first timing circuit includes relay means connected in controlling relation with said first switch means, said first switch means being actuated in response to the timing of said first period, said second switch means being successively actuable to attempt starting of said engine during the timing of said first period.

25. The remotely controlled system of claim 24 wherein the engine includes an accessory system, the improvement further comprising an accessory circuit controlling a circuit connected between the source of energy and the accessory system, said accessory control circuit being enabled in response to the timing of said first period.

26. The remotely controlled system of claim 1 further including a vehicle having a door and a cover for the engine, the receiver being connected in circuit with the source, the improvement comprising switch means connected in the circuit between the receiver and the source, said switch means disconnecting the receiver from the source in response to the opening of the door for preventing theft of the vehicle.

27. The remotely controlled system of claim 1 further including a vehicle having a door and a cover for the engine, the receiver being connected in circuit with the source, the improvement comprising switch means connected in the circuit between the receiver and the source, said switch means disconnecting the receiver from the source in response to the opening of the cover for preventing theft of the vehicle.

28. The remotely controlled system of claim 27 further including a vehicle having a door and a cover for the engine, the receiver being connected in circuit with the source, the improvement comprising switch means connected in the circuit between the receiver and the source, said switch means disconnecting the receiver from the source in response to the opening of the door for preventing theft of the vehicle.

* * * * *